(12) United States Patent
Osawa

(10) Patent No.: US 12,527,536 B2
(45) Date of Patent: Jan. 20, 2026

(54) CONTROL APPARATUS, IMAGING SYSTEM, CONTROL METHOD, AND CONTROL PROGRAM

(71) Applicant: FUJIFILM Corporation, Tokyo (JP)

(72) Inventor: Atsushi Osawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 18/620,964

(22) Filed: Mar. 28, 2024

(65) Prior Publication Data
US 2024/0324981 A1    Oct. 3, 2024

(30) Foreign Application Priority Data
Mar. 31, 2023    (JP) .................................. 2023-059421

(51) Int. Cl.
| | | |
|---|---|---|
| *A61B 6/00* | (2024.01) | |
| *A61B 6/04* | (2006.01) | |
| *A61B 6/50* | (2024.01) | |
| *A61B 8/08* | (2006.01) | |

(52) U.S. Cl.
CPC .......... *A61B 6/5258* (2013.01); *A61B 6/0414* (2013.01); *A61B 6/4417* (2013.01); *A61B 6/488* (2013.01); *A61B 6/502* (2013.01); *A61B 6/5217* (2013.01); *A61B 6/5247* (2013.01); *A61B 6/5294* (2013.01); *A61B 6/54* (2013.01); *A61B 8/0825* (2013.01)

(58) Field of Classification Search
CPC ... A61B 6/5258; A61B 6/0414; A61B 6/4417; A61B 6/488; A61B 6/502; A61B 6/5217; A61B 6/5247; A61B 6/5294; A61B 6/54; A61B 8/0825
See application file for complete search history.

(56) References Cited

U.S. PATENT DOCUMENTS

| | | | | |
|---|---|---|---|---|
| 9,495,936 | B1* | 11/2016 | Norquist | .............. H04N 9/3182 |
| 2002/0171766 | A1* | 11/2002 | Wada | .................... G09G 3/002 |
| | | | | 348/E9.037 |

(Continued)

FOREIGN PATENT DOCUMENTS

| | | |
|---|---|---|
| EP | 3692921 A1 | 8/2020 |
| JP | 2017-176509 A | 10/2017 |
| JP | 2022-057944 A | 4/2022 |

OTHER PUBLICATIONS

The extended European search report issued by the European Patent Office on Jul. 18, 2024, which corresponds to European Patent No. 24167431.6-1122 and is related to U.S. Appl. No. 18/620,964.

*Primary Examiner* — Sean A Frith
(74) *Attorney, Agent, or Firm* — Studebaker Brackett PLLC

(57) ABSTRACT

A control apparatus including at least one processor, wherein the processor is configured to: detect a color of a projection region set in advance in at least a part of an upper surface of a transparent or translucent compression member for putting a breast into a compressed state, the upper surface being located on a side opposite to a contact surface of the compression member with the breast; acquire a projection image projected onto the projection region by a projector; and correct a first pixel value of each pixel forming the projection image, based on the color of the projection region.

16 Claims, 9 Drawing Sheets

(56) References Cited

U.S. PATENT DOCUMENTS

| | | | |
|---|---|---|---|
| 2010/0208037 A1* | 8/2010 | Sendai | A61B 6/463 348/51 |
| 2013/0201225 A1* | 8/2013 | Choi | G06F 1/1639 345/690 |
| 2016/0360169 A1* | 12/2016 | Chen | H04N 9/3182 |
| 2017/0281131 A1 | 10/2017 | Sendai | |
| 2017/0360389 A1* | 12/2017 | Ochiai | A61B 6/502 |
| 2018/0184999 A1* | 7/2018 | Davis | A61B 8/403 |
| 2021/0315533 A1* | 10/2021 | Kim | A61B 6/0435 |
| 2021/0401385 A1* | 12/2021 | Kobayashi | A61B 6/4035 |
| 2022/0096025 A1 | 3/2022 | Fujimoto et al. | |
| 2022/0101553 A1 | 3/2022 | Konno et al. | |
| 2023/0321894 A1* | 10/2023 | Ekinaka | B29C 53/04 264/241 |
| 2025/0090116 A1* | 3/2025 | Carpenter | A61B 6/469 |

\* cited by examiner

FIG. 12

| DETECTION COLOR | | | | PROJECTION COLOR | | | | |
|---|---|---|---|---|---|---|---|---|
| COLOR NAME | R | G | B | COLOR NAME | R | G | B | LIGHT AMOUNT (%) |
| BLACK | 0 | 0 | 0 | (COMPLEMENTARY COLOR) WHITE | 255 | 255 | 255 | 80 |
| RED | 255 | 0 | 0 | (COMPLEMENTARY COLOR) CYAN | 0 | 255 | 255 | 80 |
| GREEN | 0 | 255 | 0 | (COMPLEMENTARY COLOR) MAGENTA | 255 | 0 | 255 | 90 |
| BLUE | 0 | 0 | 255 | (COMPLEMENTARY COLOR) YELLOW | 255 | 255 | 0 | 100 |
| SKIN OF ASIAN | 255 | 234 | 219 | (COMPLEMENTARY COLOR) LIGHT BLUE | 219 | 240 | 255 | 100 |
| SKIN OF CAUCASIAN | 254 | 247 | 240 | ORANGE | 255 | 165 | 0 | 80 |
| SKIN OF AFRICAN AMERICAN | 168 | 137 | 112 | (OPPOSITE COLOR) BLUE GRAY | 87 | 118 | 143 | 90 |
| ... | ... | ... | ... | ... | ... | ... | ... | ... |

59

CONTROL APPARATUS, IMAGING SYSTEM, CONTROL METHOD, AND CONTROL PROGRAM

CROSS-REFERENCE TO RELATED APPLICATIONS

This application claims priority from Japanese Application No. 2023-059421, filed on Mar. 31, 2023, the entire disclosure of which is incorporated herein by reference.

BACKGROUND

Technical Field

The present disclosure relates to a control apparatus, an imaging system, a control method, and a control program.

Related Art

In the related art, for the purpose of detecting a lesion in a breast, such as breast cancer, a mammography examination in which a radiation image of the breast is captured and an ultrasound examination in which an ultrasound image of the breast is captured have been performed. Due to a difference in principle, calcification tends to be easily visualized in radiography and a boundary of a soft tissue, such as a tumor, tends to be easily visualized in ultrasound imaging. Therefore, it is possible to improve a detection sensitivity of the lesion by using the above methods in combination.

However, by capturing the radiation image and the ultrasound image of the breast, there is a case in which a shadow, which is not the lesion, is erroneously detected to be suspected of being a lesion (that is, specificity is reduced). As one of the factors, it is conceived that the comparison is difficult because positions of the shadow seen in each image are different due to a difference in a posture of an examinee such that the breast is imaged in a compressed state in the mammography examination and the breast is imaged in a supine state in the ultrasound examination. For example, even in a case in which the shadow detected from one image can be determined to be negative by comparative image interpretation with the other image, there is a case in which it cannot be determined to be negative due to the difficulty of the comparison, which requires a detailed examination.

Therefore, in order to facilitate the comparative image interpretation of the radiation image and the ultrasound image, a configuration is proposed in which, in a mammography apparatus that performs the radiography with the breast in the compressed state, the ultrasound image can also be captured while the breast is put into the compressed state. For example, JP2017-176509A discloses an apparatus that captures a radiation image and an ultrasound image of a breast put into a compressed state by a compression member.

Further, for example, JP2022-057944A discloses that various types of information, such as a skin line image, is projected onto a compression member by an image projection unit (projector) in order to support positioning of the breast in a mammography apparatus.

In the apparatus that captures both the radiation image and the ultrasound image in a state in which the breast is put into the compressed state, as disclosed in JP2017-176509A, the time in which the breast is in the compressed state may be long, and thus the pain of examinee may be increased.

Therefore, by projecting information that can support the examination onto the breast via the compression member, it is conceivable to adopt a method of reducing the time in which the breast is in the compressed state and performing more accurate comparative image interpretation of the radiation image and the ultrasound image. However, since there are individual differences in a color of a skin of a human, and the color may be partially different due to a spot, a mole, a sunburn, a scar, or the like, it may be difficult to visually recognize the information in a case in which the information is uniformly projected. Therefore, there is a demand for a technique that can improve the visibility in a case in which the information is projected onto the breast via the compression member.

SUMMARY

The present disclosure provides a control apparatus, an imaging system, a control method, and a control program which can improve visibility in a case in which information is projected onto a breast via a compression member.

A first aspect of the present disclosure relates to a control apparatus comprising: at least one processor, in which the processor detects a color of a projection region set in advance in at least a part of an upper surface of a transparent or translucent compression member for putting a breast into a compressed state, the upper surface being located on a side opposite to a contact surface of the compression member with the breast, acquires a projection image projected onto the projection region by a projector, and corrects a first pixel value of each pixel forming the projection image, based on the color of the projection region.

In the first aspect, the processor may correct the first pixel value so that a color indicated by the first pixel value is a complementary color or an opposite color of the color of the projection region.

In the first aspect, the processor may correct the first pixel value by using a table in which a correspondence relationship between the first pixel value and the color of the projection region is determined in advance.

In the first aspect, the processor may specify a corresponding part of the projection region for each pixel of the projection image, may detect a color for each part of the projection region, and may correct the first pixel value based on the color of the corresponding part of the projection region.

In the first aspect, the processor may detect a color for each part of the projection region, may calculate an average color of the color for each part of the projection region, and may correct the first pixel value based on the average color.

In the first aspect, the processor may acquire a radiation image obtained by imaging the breast, extract a region of interest from the radiation image, and generate the projection image indicating a position of the region of interest.

In the first aspect, the processor may generate the projection image including text information indicating at least one of examinee information on an examinee having the breast, imaging condition information on an imaging condition in a case in which at least one of a radiation image or an ultrasound image of the breast is captured, or region-of-interest information on a region of interest included in the breast.

In the first aspect, the processor may detect a color for each part of the projection region, may divide the projection region into a breast region including the breast and a non-breast region not including the breast, based on the color for each part of the projection region, and may generate the projection image so that the text information is projected onto the non-breast region.

In the first aspect, the processor may adjust a light amount in a case in which the projection image is projected onto the projection region by the projector, based on the color of the projection region.

In the first aspect, the processor may detect at least one of a color or an illuminance of ambient light in an environment in which the projection image is projected onto the projection region by the projector, and may correct the first pixel value based on the color of the projection region and at least one of the color or the illuminance of the ambient light.

In the first aspect, the processor may adjust a light amount in a case in which the projection image is projected onto the projection region by the projector, based on at least one of the color or the illuminance of the ambient light.

A second aspect of the present disclosure relates to an imaging system comprising: the control apparatus according to the first aspect; and an imaging apparatus, in which the imaging apparatus includes the compression member for putting the breast into the compressed state between the compression member and an imaging table, a radiation source that irradiates the breast put into the compressed state by the compression member with radiation, a radiation detector that detects the radiation transmitted through the compression member and the breast, to generate a radiation image, an ultrasound probe that captures an ultrasound image of the breast put into the compressed state by the compression member, from a side of the upper surface of the compression member, and the projector that projects the projection image onto the projection region of the compression member.

In the second aspect, the imaging apparatus may capture the radiation image of the breast by using the radiation source and the radiation detector, and then capture the ultrasound image of the breast by using the ultrasound probe, and the processor controls the projector to project the projection image in a period from completion of capturing the radiation image to completion of capturing the ultrasound image.

In the second aspect, a part of the compression member including the contact surface and the upper surface may have a total light transmittance equal to or higher than 85%, which is measured in accordance with ISO 13468-1.

A third aspect of the present disclosure relates to a control method including: detecting a color of a projection region set in advance in at least a part of an upper surface of a transparent or translucent compression member for putting a breast into a compressed state, the upper surface being on a side opposite to a contact surface of the compression member with the breast; acquiring a projection image projected onto the projection region by a projector; and correcting a first pixel value of each pixel forming the projection image, based on the color of the projection region.

In the third aspect of the present disclosure, a control program for causing a computer to execute a process including: detecting a color of a projection region set in advance in at least a part of an upper surface of a transparent or translucent compression member for putting a breast into a compressed state, the upper surface being on a side opposite to a contact surface of the compression member with the breast; acquiring a projection image projected onto the projection region by a projector; and correcting a first pixel value of each pixel forming the projection image, based on the color of the projection region.

According to the aspects described above, the control apparatus, the imaging system, the control method, and the control program according to the present disclosure can improve the visibility in a case in which the information is projected onto the breast via the compression member.

BRIEF DESCRIPTION OF THE DRAWINGS

FIG. 12 is an example of a correction table.

DETAILED DESCRIPTION

Hereinafter, a description of an embodiment of the present disclosure will be made with reference to the accompanying drawings.

Figure 1:
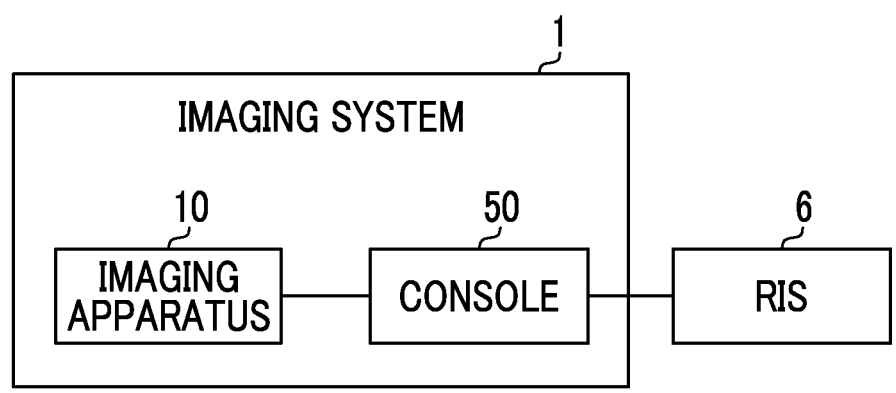
FIG. 1 is a view showing an example of a schematic configuration of an imaging system.

First, a description of a configuration of an imaging system 1 will be made with reference to FIG. 1. FIG. 1 is a view showing an example of a schematic configuration of the imaging system 1. As shown in FIG. 1, the imaging system 1 comprises an imaging apparatus 10 and a console 50. The imaging apparatus 10 and the console 50, and the console 50 and an external radiology information system (RIS) 6 are configured to be connected to each other via a wired or wireless network.

In the imaging system 1, the console 50 acquires an imaging order or the like from the RIS 6, and controls the imaging apparatus 10 in accordance with the imaging order, an instruction from the user, and the like. The imaging apparatus 10 acquires a radiation image and an ultrasound image of a breast of an examinee put into a compressed state by a compression member 40 as a subject. The console 50 is an example of a control apparatus according to the present disclosure.

Figure 2:
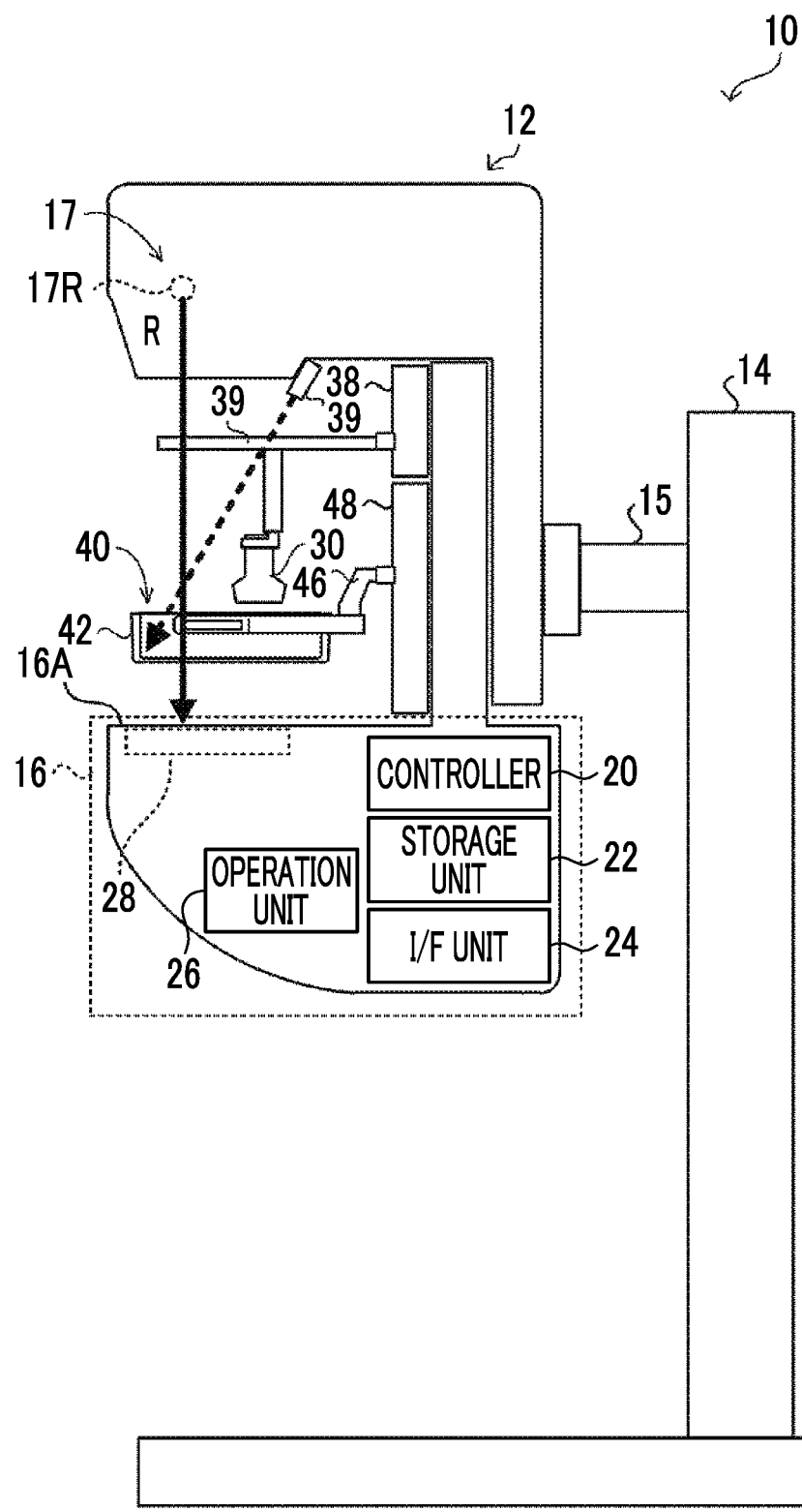
FIG. 2 is a side view showing an example of an appearance of an imaging apparatus.

Next, a description of a schematic configuration of the imaging apparatus 10 will be made with reference to FIG. 2. FIG. 2 is a side view showing an example of an appearance of the imaging apparatus 10, and is a view in a case in which the imaging apparatus 10 is viewed from a right side of the examinee. As shown in FIG. 2, the imaging apparatus 10 comprises a radiation source 17R, a radiation detector 28, an imaging table 16 disposed between the radiation source 17R and the radiation detector 28, the compression member 40 that compresses a breast 2 between the compression member 40 and the imaging table 16, an ultrasound probe 30 disposed between the radiation source 17R and the compression member 40, and a projector 39. In the imaging apparatus 10, a user, such as a doctor or a technician, positions the breast 2 of the examinee on an imaging surface 16A of the imaging table 16.

The imaging apparatus 10 comprises an arm part 12, a base 14, and a shaft part 15. The arm part 12 is held to be movable in an up-down direction (Z direction) by the base 14. The shaft part 15 connects the arm part 12 to the base 14. The arm part 12 is relatively rotatable with respect to the base 14 with the shaft part 15 as a rotation axis. In addition, the arm part 12 may be relatively rotatable with respect to the base 14 with the shaft part 15 as the rotation axis separately between an upper part comprising a radiation emitting unit 17 and a lower part comprising the imaging table 16.

The arm part 12 comprises the radiation emitting unit 17 and the imaging table 16. The radiation emitting unit 17 comprises the radiation source 17R, and is configured to change an irradiation field of radiation (for example, X-rays) emitted from the radiation source 17R. For example, the change of the irradiation field may be performed by the user operating an operation unit 26, or may be performed by a controller 20 in accordance with a type of the attached compression member 40. The radiation source 17R irradiates the breast put into the compressed state by the compression member 40 with radiation R.

The imaging table 16 comprises the controller 20, a storage unit 22, an interface (I/F) unit 24, the operation unit 26, and the radiation detector 28. The controller 20 controls an overall operation of the imaging apparatus 10 in accordance with the control of the console 50. The controller 20 comprises a central processing unit (CPU), a read only memory (ROM), a random access memory (RAM), and the like (none shown). The ROM stores in advance various programs including a program executed by the CPU for performing the control related to the acquisition of the radiation image and the ultrasound image. The RAM transitorily stores various data.

Data of the radiation image and the ultrasound image, various types of other information, and the like are stored in the storage unit 22. The storage unit 22 is realized by, for example, a storage medium, such as a hard disk drive (HDD), a solid state drive (SSD), and a flash memory.

The I/F unit 24 performs communication of various types of information with the console 50 by wired or wireless communication. Specifically, the I/F unit 24 receives information related to the control of the imaging apparatus 10 from the console 50. Further, the I/F unit 24 transmits the data of the radiation image and the ultrasound image to the console 50.

The operation unit 26 is a part that is provided on the imaging table 16 or the like and can be operated by the user with a hand, a foot, or the like, and is, for example, a switch, a button, or a touch panel. For example, the operation unit 26 may receive a voice input from the user.

The radiation detector 28 is disposed in the imaging table 16, detects the radiation R transmitted through the compression member 40, the breast, the imaging table 16, generates the radiation image based on the detected radiation R, and outputs image data indicating the generated radiation image. It should be noted that a type of the radiation detector 28 is not particularly limited and may be, for example, an indirect conversion type radiation detector that converts the radiation R into light and converts the converted light into a charge, or a direct conversion type radiation detector that directly converts the radiation R into a charge.

A probe unit 38 and a compression unit 48 are connected to the arm part 12. A support part 36 that attachably and detachably supports the ultrasound probe 30 is attached to the probe unit 38. The support part 36 (ultrasound probe 30) is moved in the up-down direction (Z direction) and a horizontal direction (X direction and Y direction) by a driving unit (not shown) provided in the probe unit 38. In addition, the support part 36 may be relatively rotatable with respect to the base 14 with an engaging part with the probe unit 38 as a rotation axis. It is preferable that the support part 36 is formed of a material that transmits the radiation R. In addition, it is preferable that the support part 36 is configured to transitorily fix the position of the ultrasound probe 30.

The ultrasound probe 30 captures an ultrasound image of the breast put into the compressed state by the compression member 40, from an upper surface 43A side of the compression member 40. The ultrasound probe 30 is disposed between the radiation source 17R and the compression member 40, irradiates the breast with ultrasound via the compression member 40, and receives the reflected waves from the breast. Specifically, the ultrasound probe 30 comprises an ultrasound transducer array. The ultrasound transducer array is configured such that a plurality of ultrasound transducers are arranged one-dimensionally or two-dimensionally. The ultrasound transducer is formed, for example, such that electrodes are formed on both ends of a piezoelectric body, such as a piezoelectric ceramic represented by lead (Pb) zirconate titanate (PZT) or a polymer piezoelectric element represented by polyvinylidene difluoride (PVDF). The probe unit 38 includes a converter (not shown) that converts the reflected waves from the breast received by the ultrasound probe 30 into the ultrasound image, and the ultrasound image is obtained by the converter.

In addition, a plurality of types of the ultrasound probes 30 different from each other may be attachable to the imaging apparatus 10. For example, depending on a physique of the examinee (for example, a size of the breast), a tissue composition of the breast (for example, a fat mass and a mammary gland mass), a type of imaging (for example, magnification imaging and spot imaging), and the like, the ultrasound probes 30 having different types from each other may be prepared and can be attached to and detached from the imaging apparatus 10. For example, the ultrasound probes 30 having different performances and dimensions from each other may be selectively used, such as a linear probe having a center frequency of about 7.5 MHz (for superficial use or the like), a convex probe having a center frequency of about 3.5 MHz (for abdomen or the like), and a sector probe having a center frequency of about 2.5 MHZ (for heart or the like).

A support part 46 that supports the compression member 40 is attachably and detachably attached to the compression unit 48. The support part 46 (compression member 40) is moved in the up-down direction (Z direction) by a driving unit (not shown) provided in the compression unit 48. In addition, the support part 46 may be relatively rotatable with respect to the base 14 with an engaging part with the compression unit 48 as a rotation axis.

Figure 3:
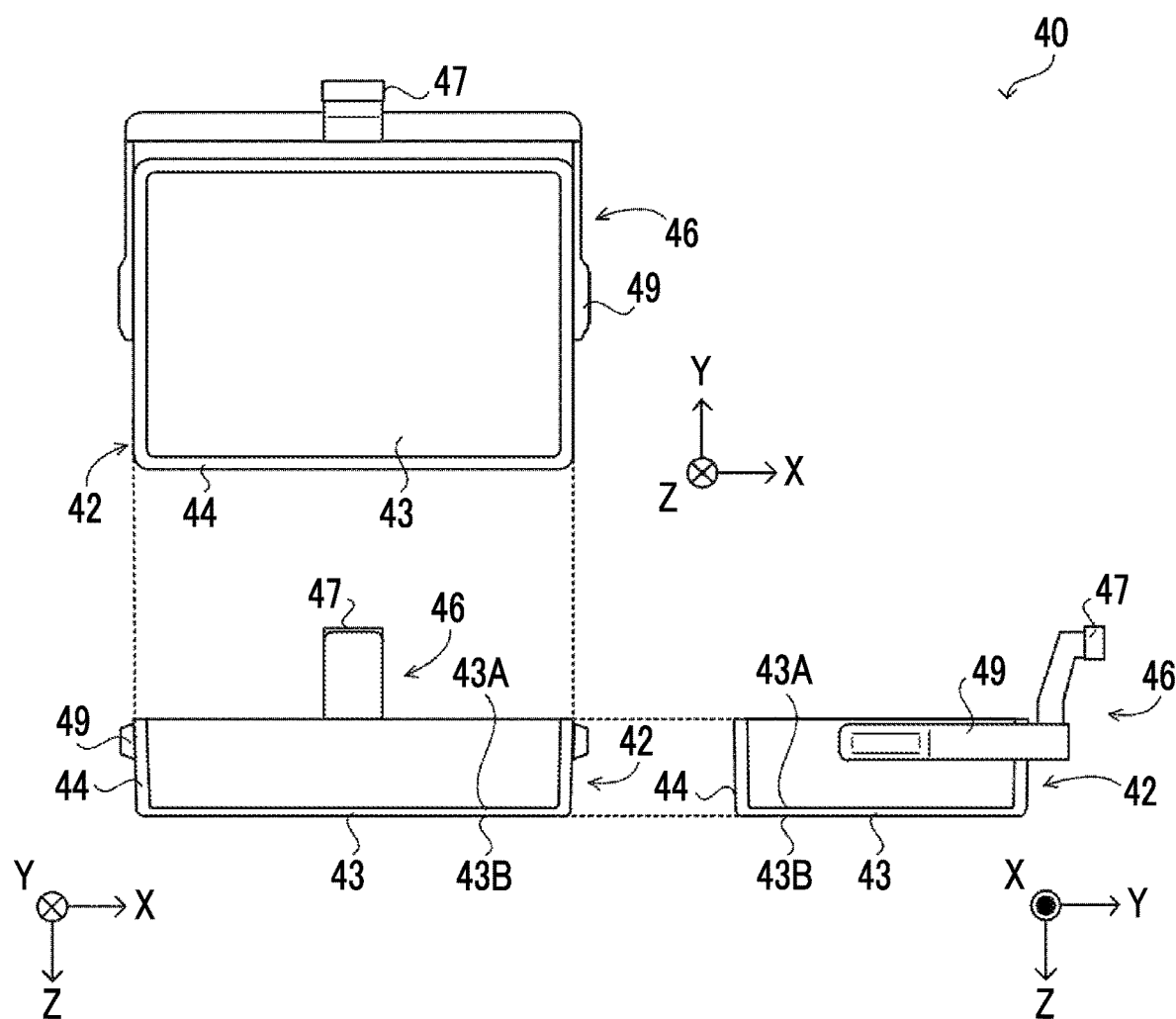
FIG. 3 is a three-orthographic view showing an example of a schematic configuration of a compression member.

The compression member 40 is used to put the breast disposed on the imaging surface 16A into the compressed state. Specifically, the compression member 40 is disposed between the radiation source 17R and the imaging table 16 and interposes the breast between the compression member 40 and the imaging table 16 to put the breast into the compressed state. FIG. 3 shows a three-orthographic view of an example of the compression member 40. The three-orthographic view of FIG. 3 includes a top view of the compression member 40 as viewed from above (radiation emitting unit 17 side), a side view thereof as viewed from the examinee side, and a side view thereof as viewed from the right side of the examinee. As shown in FIG. 3, the compression member 40 includes a compression part 42 and the support part 46.

The support part 46 includes an attachment part 47 and an arm 49. The attachment part 47 attaches the compression member 40 to the imaging apparatus 10, specifically, the driving unit of the compression unit 48. The arm 49 supports the compression part 42.

The compression part 42 has a bottom part 43 surrounded by a wall part 44, and has a cross section shape formed in a recess shape. In the bottom part 43, a contact surface 43B that contacts the breast of the examinee has a substantially constant thickness, and the upper surface 43A on the radiation source 37R side that is flat and has a substantially uniform height. The wall part 44 is relatively high, and has a substantially uniform height.

The compression part 42 is formed of an optically transparent or translucent material in order to perform positioning and check of the compressed state in the compression of the breast. In addition, it is preferable that the compression part 42 is formed of a material excellent in a transmittance of the radiation R and the ultrasound. In addition, it is preferable that the compression part 42 is formed of, for example, a material excellent in strength, such as drop strength and compression strength.

As such a material, for example, resin, such as polymethylpentene (PMP), polycarbonate (PC), acryl, polypropylene (PP), and polystyrene (PS), can be used. In addition, it is possible to use, for example, resin, such as polyethylene terephthalate (PET) or acrylonitrile butadiene styrene (ABS). In particular, in the polymethylpentene, an acoustic impedance, which affects the transmittance and the reflectivity of the ultrasound, is closer to an acoustic impedance of a human body (breast) than other materials, and a proportion of the noise on the ultrasound image can be decreased. Therefore, as the material of the compression part 42, the polymethylpentene is suitable.

It should be noted that the compression part 42 being "optically transparent or translucent" means that the compression part 42 has transparency equal to or more than the extent that a color and an outline of the breast as a compression target can be checked via the compression part 42. For example, the compression part 42 (part including the contact surface 43B and the upper surface 43A) of the compression member 40 need only have a total light transmittance equal to or higher than 50%, which is measured in accordance with ISO 13468-1. The transparency of various types of region that can be used as the material of the compression part 42 varies depending on the material and the thickness. However, in a case in which the total light transmittance of the compression part 42 is set to be equal to or higher than 50%, the transparency sufficient for positioning and checking the compressed state of the breast can be ensured. It should be noted that the total light transmittance of the compression part 42 is more preferably equal to or higher than 70%, and still more preferably equal to or higher than 85%. The visibility of the breast can be further improved as the total light transmittance is higher. It should be noted that the method of measuring the total light transmittance is not limited to ISO 13468-1 (corresponding to JIS K 7361-1), and for example, other measuring methods, such as JIS K 7375, can also be used.

In addition, a plurality of types of the compression members 40 different from each other may be attachable to the imaging apparatus 10. For example, depending on a physique of the examinee (for example, a size of the breast), a tissue composition of the breast (for example, a fat mass and a mammary gland mass), a type of imaging (for example, magnification imaging and spot imaging), and the like, compression members 40 having different types from each other may be prepared and can be attached to and detached from the imaging apparatus 10. Specifically, a compression member in accordance with the size of the breast, a compression member for axilla imaging, a compression member for magnification imaging, and a compression member for so-called spot imaging that captures the radiation image of only a region in which a lesion exists, and the like may be used. That is, the compression member 40 is not limited to the compression member that compresses the entire breast, and may have a smaller size than the breast to compress a part of the breast.

Figure 4:
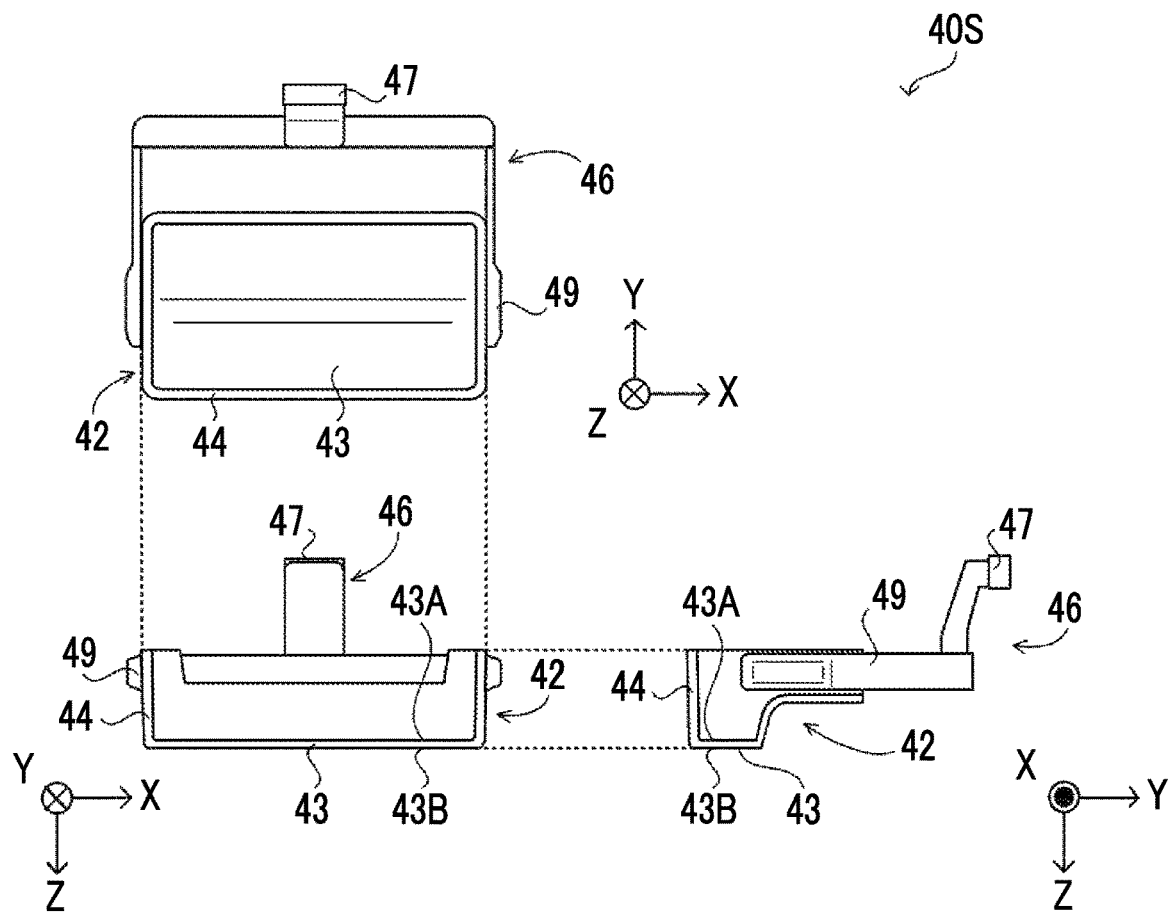
FIG. 4 is a three-orthographic view showing an example of the schematic configuration of the compression member.

FIG. 4 shows a three-orthographic view of a compression member 40S for a small breast as an example of another form different from the compression member 40 of FIG. 3. The three-orthographic view of FIG. 4 includes a top view of the compression member 40S as viewed from above (radiation emitting unit 17 side), a side view thereof as viewed from the examinee side, and a side view thereof as viewed from the right side of the examinee. The compression member 40S includes the compression part 42 and the support part 46, as in the compression member 40 in FIG. 3. In the compression member 40S, the bottom part 43 is not flat, and the attachment part 47 side is higher than a chest wall side (side away from the attachment part 47). In addition, the height of the wall part 44 is not uniform, and a height of a part of the chest wall side is lower than a height of other parts. Due to such a shape, the compression member 40S can easily perform the positioning and the compression even for the small breast.

As described above, in the imaging apparatus 10, at least one of the compression member 40 for putting the breast into the compressed state or the ultrasound probe 30 for acquiring the ultrasound image may be attachable and detachable. That is, a plurality of types of the compression members 40 and the ultrasound probes 30 having different dimensions from each other may be attachable to the imaging apparatus 10. In this case, the imaging apparatus 10 may detect the types of the compression member 40 and the ultrasound probe 30 that are attached.

For example, the attachment part 47 of the compression member 40 may be provided with a plurality of pins having different dispositions for each type of the compression member 40 as identification information, and the identification information may be read by a sensor (for example, a photointerrupter) that can detect the disposition of the pins provided in the compression unit 48. In addition, for example, a marker (for example, a bar code and a two-dimensional code) in accordance with the type of the compression member 40 may be provided at any position of the compression member 40 as identification information, and the identification information may be read by a sensor (for example, a charge coupled device (CCD) sensor) that can detect the marker.

In addition, for example, a radio frequency identification (RFID) tag having identification information in accordance with the type of the compression member 40 may be provided at any position of the compression member 40, and the identification information may be read by an RFID reader that can read the RFID tag. In addition, for example, a weight of each type of the compression member 40 and identification information may be stored in the storage unit 22 in advance in association with each other, the weight of the attached compression member 40 may be measured by a sensor that can detect the weight, and the identification information (type of the compression member 40) may be specified based on a measured value.

Similarly, for the ultrasound probe 30, the type of the attached ultrasound probe 30 may be identified in accordance with, for example, the pin, the marker, the RFID tag, or the weight.

At least one projector 39 is provided at a position of an arm part 32 which is away from the examinee, below the radiation emitting unit 37. The projector 39 projects a projection image onto a projection region set in advance in at least a part of the upper surface 43A of the compression member 40, the upper surface 43A being located on a side opposite to the contact surface 43B of the compression member 40 with the breast, under the control of the console 50.

Figure 5:
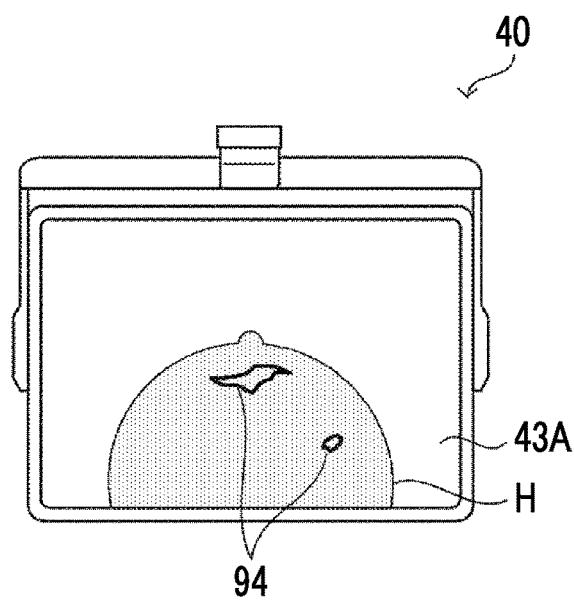
FIG. 5 is a diagram showing an example of a state in which a projection image is projected.

FIG. 5 is a diagram showing an example of a state in which a projection image 94 is projected onto the upper surface 43A of the compression member 40 by the projector 39. The projection image 94 in FIG. 5 shows a position of a region of interest in the breast (details will be described below). As shown in FIG. 5, by projecting the projection image 94 indicating the position of the region of interest onto the upper surface 43A, the user such as the doctor or the technician who performs an ultrasound examination can check the position of the region of interest in a breast H.

It should be noted that the projection region need only include at least a part of the upper surface 43A, and may include the entire upper surface 43A or other regions (for example, the wall part 44 of the compression member 40, the imaging surface 16A of the imaging table 16, and the like). As the projector 39, known projectors, such as a liquid crystal projector, a digital light processing (DLP) (registered trademark) projector, and a laser projector, can be used. It should be noted that the projector 39 may be configured by a plurality of projectors. Further, a mirror or the like for changing a projection direction of the projector 39 may be provided.

It should be noted that the method of imaging the breast via the imaging apparatus 10 is not particularly limited. For example, cranio-caudal (CC) imaging, medio-lateral oblique (MLO) imaging, the magnification imaging and the spot imaging for imaging a part of the breast, and the like may be performed. The CC imaging is a method of imaging the breast in the compressed state by interposing the breast between the imaging table 16 and the compression member 40 in the up-down direction (Z direction). The MLO imaging is a method of imaging the breast in the compressed state including an axilla portion by interposing the breast between the imaging table 16 and the compression member 40 in a tilted state in which a rotation angle of the arm part 12 with respect to the base 14 is equal to or greater than 45 degrees and smaller than 90 degrees.

In addition, for example, the imaging apparatus 10 may perform tomosynthesis imaging. In the tomosynthesis imaging, the radiation R is emitted from each of a plurality of irradiation positions having different irradiation angles toward the breast by the radiation source 17R, to capture a plurality of radiation images of the breast. That is, in the tomosynthesis imaging, the imaging is performed by changing the rotation angle of the radiation emitting unit 17 with respect to the base 14 while fixing the angles of the imaging table 16, the compression member 40, the breast, and the like.

In addition, in the imaging apparatus 10, the breast of the examinee may be positioned not only in a state in which the examinee is standing (standing state) but also in a state in which the examinee is sitting on a chair, a wheelchair, or the like (sitting state).

The imaging apparatus 10 captures the radiation image of the breast put into the compressed state by the compression member 40, by using the radiation source 17R and the radiation detector 28, and then captures the ultrasound image by using the ultrasound probe 30. That is, the radiation image and the ultrasound image are continuously captured while the breast is in the compressed state. In this case, it is desirable to reduce the time in which the breast is in the compressed state as much as possible in order to reduce the pain of the examinee. Therefore, the imaging apparatus 10 projects information for supporting the ultrasound examination on the breast via the compression member 40 by the projector 39 in a period from completion of capturing the radiation image to completion of capturing the ultrasound image. In this manner, the examination time is reduced, and the time in which the breast is in the compressed state is reduced.

Figure 6:
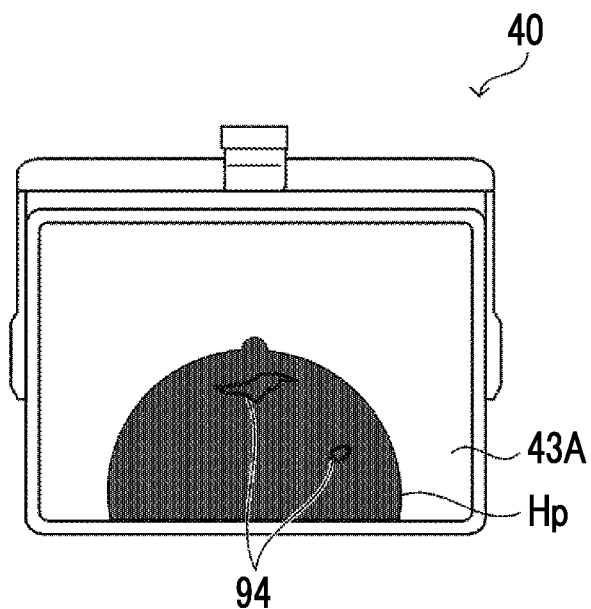
FIG. 6 is a diagram showing an example of a state in which the projection image is projected.
Figure 7:
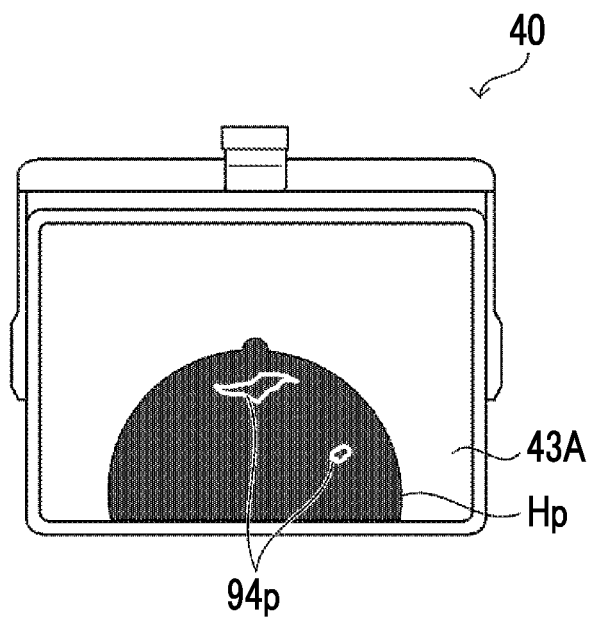
FIG. 7 is a diagram showing an example of a state in which the projection image is projected.

However, since there are individual differences in a color of a skin of a human, and the color may be partially different due to a spot, a mole, a sunburn, a scar, or the like, it may be difficult to visually recognize the projection image in a case in which the color and the illuminance of the projection image from the projector 39 are uniform. FIGS. 6 and 7 show examples of a state in which a breast Hp having a color of a skin different from the breast H in FIG. 5 is used as the subject and the projection image 94 or a projection image 94p is projected onto the upper surface 43A of the compression member 40 by the projector 39. Similar to the projection image 94 in FIG. 5, the projection image 94 in FIG. 6 is an image showing the position of the region of interest in the breast, but the visibility is decreased because the contrast between a color of a line indicating the position of the region of interest and the color of the skin of the breast Hp is weak. On the other hand, since the color of the projection image 94 (line indicating the position of the region of interest) in FIG. 5 is corrected so that the contrast between the projection image 94p in FIG. 7 and the color of the skin of the breast Hp is increased, the visibility is improved.

The console 50 according to the present disclosure has a function of correcting the projection image in accordance with the color of the projection region so that the visibility can be improved in a case in which the information is projected onto the breast via the compression member 40. Hereinafter, a description of the console 50 will be made.

Figure 8:
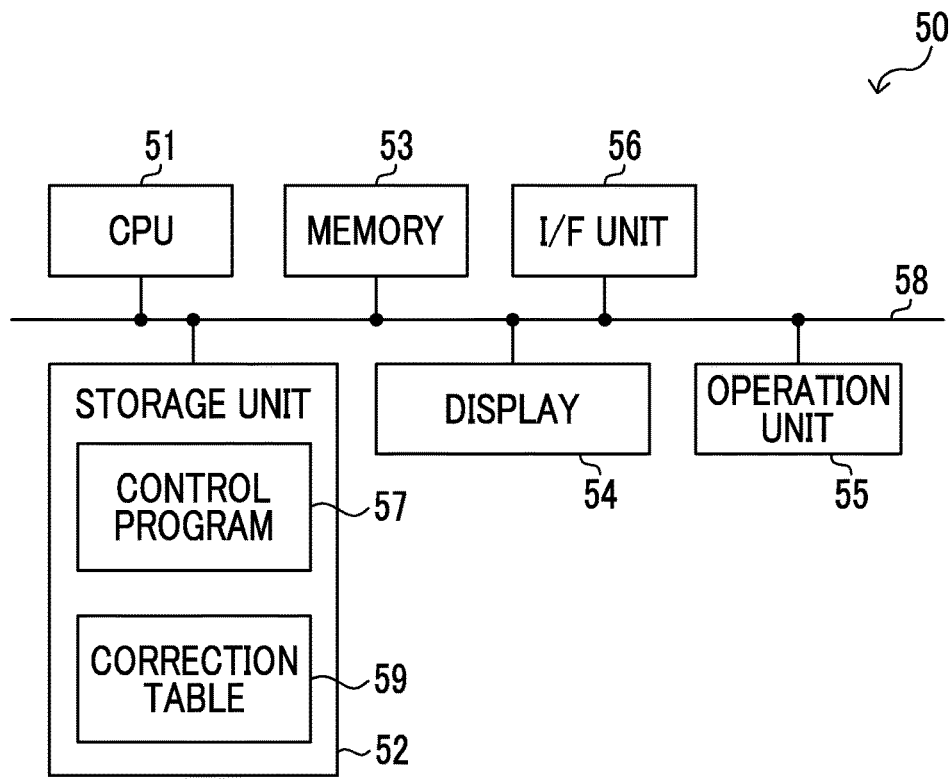
FIG. 8 is a block diagram showing an example of a hardware configuration of a console.

A description of an example of a hardware configuration of the console 50 will be made with reference to FIG. 8. As shown in FIG. 8, the console 50 includes a CPU 51, a non-volatile storage unit 52, and a memory 53 as a transitory storage region. In addition, the console 50 includes a display 54, such as a liquid crystal display, an operation unit 55, such as a touch panel, a keyboard, and a mouse, and an I/F unit 56. The I/F unit 56 performs wired or wireless communication with the imaging apparatus 10, the RIS 6, and other external apparatuses. The CPU 51, the storage unit 52, the memory 53, the display 54, the operation unit 55, and the I/F unit 56 are connected to each other via a bus 58, such as a system bus and a control bus, so that various types of information can be exchanged.

The storage unit 52 is realized by, for example, a storage medium, such as an HDD, an SSD, and a flash memory. The storage unit 52 stores a control program 57 in the console 50 and a correction table 59 (details will be described below). The CPU 51 reads out the control program 57 from the storage unit 52 to deploy the control program 57 into the memory 53, and executes the deployed control program 57. As the console 50, for example, a personal computer, a server computer, a smartphone, a tablet terminal, a wearable terminal, or the like can be applied as appropriate.

In addition, the storage unit 52 stores the image data of the radiation image and the ultrasound image acquired by the imaging apparatus 10, various types of other information, and the like. The image data of the radiation image and the ultrasound image may be stored in association with at least one of the imaging order or the imaging information. The imaging information may be, for example, at least one of examinee information and an imaging item that are included in the imaging order, photographer information indicating a photographer (for example, the user, such as the doctor or the technician) who performs the imaging, or date and time information indicating date and time when the imaging is performed.

Figure 9:
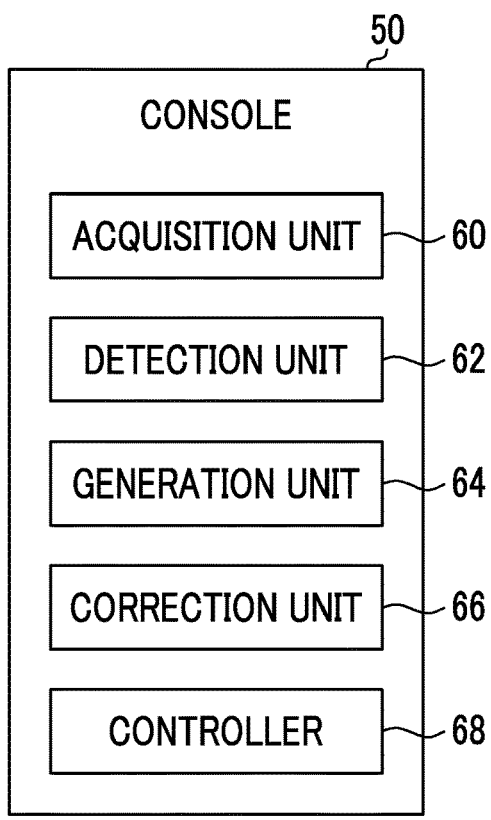
FIG. 9 is a block diagram showing an example of a functional configuration of the console.

A description of an example of a functional configuration of the console 50 will be made with reference to FIG. 9. As shown in FIG. 9, the console 50 includes an acquisition unit 60, a detection unit 62, a generation unit 64, a correction unit 66, and a controller 68. In a case in which the CPU 51 executes the control program 57, the CPU 51 functions as the acquisition unit 60, the detection unit 62, the generation unit 64, the correction unit 66, and the controller 68.

The acquisition unit 60 acquires the radiation image obtained by imaging the breast put into the compressed state by the compression member 40 from the imaging apparatus 10. Specifically, the acquisition unit 60 may acquire the radiation image stored in the storage unit 22 of the imaging apparatus 10 via the I/F unit 56, may acquire the radiation image stored in the storage unit 52, or may acquire the radiation image stored in the external apparatus.

Figure 10:
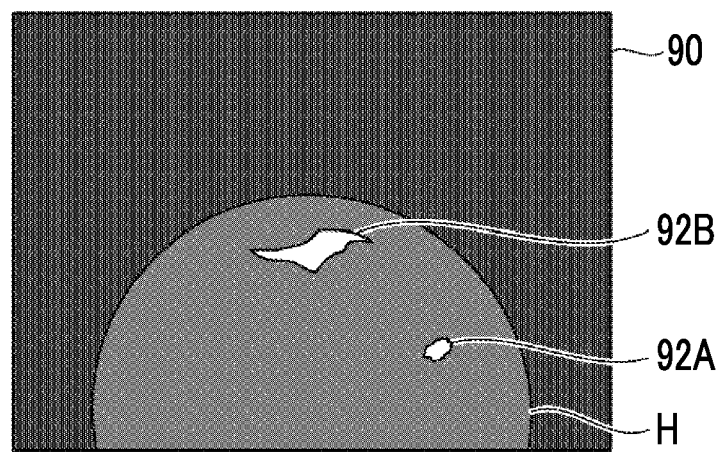
FIG. 10 is a diagram showing an example of a radiation image.

FIG. 10 shows an example of a radiation image 90. The radiation image 90 of FIG. 10 is obtained by imaging the breast H as a subject, and includes an abnormal shadow 92A and a high mammary gland region 92B. It is desirable to perform the ultrasound examination on the abnormal shadow 92A and the high mammary gland region 92B.

The detection unit 62 detects the color of the projection region set in advance in at least a part of the upper surface 43A of the compression member 40, the upper surface 43A being located on a side opposite to the contact surface 43B of the compression member 40 with the breast. As described above, since the projection region includes the breast and/or the imaging surface 16A, the color of the projection region is substantially the color of the breast and/or the imaging surface 16A observed via the compression member 40.

It should be noted that the method of detecting the color of the projection region is not particularly limited. For example, a visible light image of the projection region may be captured, and the pixel value of the visible light image may be detected as the color of the projection region. For example, the visible light image is captured by a digital camera that captures a visible light image of the examinee, and includes a complementary metal oxide semiconductor (CMOS) type image sensor or a charge coupled device (CCD) type image sensor. In addition, for example, the color of the projection region may be detected by using a color sensor that specifies the color of the object by applying light, receiving the reflected light, and measuring the intensity for each wavelength of the received light.

Hereinafter, the color of the projection region detected by the detection unit 62 will be referred to as a "detection color". In addition, in the following description, the description will be made with the assumption that the detection color is represented in an RGB color space. The RGB color space is a representation method of a color in which three elements of red (R), green (G), and blue (B) are represented by a predetermined gradation (for example, 256 gradations from 0 to 255). For example, in a case of 256 gradations, a case in which (R, G, B) is (0, 0, 0) represents black, and a case in which (R, G, B) is (255, 255, 255) represents white. By operating three values of R, G, and B as described above, hue, brightness, and chroma saturation can be changed.

In addition, it is preferable that the detection unit 62 detects the color for each part of the projection region. As described above, the projection region includes the imaging surface 16A as well as the breast, or a spot, a mole, a sunburn, a scar, or the like occurs in a part of the breast. Therefore, it is preferable that the detection unit 62 detects the color for a plurality of positions in the projection region.

For example, in a case of using the visible light image, the detection color can be detected for each part of the projection region with reference to the pixel value (including three values of R, G, and B) for each pixel of the visible light image. For example, in a case of using the color sensor, the detection color can be detected for each part of the projection region by performing measurement a plurality of times while changing a measurement point in the projection region. Hereinafter, the description will be made with the assumption that the detection unit 62 detects the color for each part of the projection region.

The generation unit 64 generates the projection image to be projected onto the projection region by the projector 39. The projection image includes information for supporting the ultrasound examination. Examples of such information include information indicating the position of the region of interest in the breast, as shown in FIG. 5.

In this case, the generation unit 64 extracts the region of interest from the radiation image acquired by the acquisition unit 60. The region of interest is, for example, a region of the abnormal shadow suspected of being the lesion, the high mammary gland region for which the image interpret from the radiation image is difficult, or the like. Further, the generation unit 64 generates the projection image indicating the position of the extracted region of interest.

It should be noted that, as the method of extracting the region of interest, for example, a method using a known computer aided detection/diagnosis (CAD) technique can be applied as appropriate. As the method of extracting the region of interest using the CAD technique, for example, a method using a learning model, such as a convolutional neural network (CNN), may be applied. For example, the generation unit 64 may extract the region of interest by using a trained model that has been trained in advance to receive the radiation image as an input and then extract and output the region of interest included in the radiation image. In addition, for example, the generation unit 64 may specify the region designated by the user via the operation unit 55 as the region of interest.

Further, for example, the projection image may include text information for supporting the ultrasound examination. For example, the text information may be examinee information on the examinee having the breast, such as the name, age, gender, and identification ID of the examinee, and information indicating whether an examination target is a right breast or a left breast. For example, the text information may be imaging condition information on an imaging condition in a case of imaging at least one of the radiation image or the ultrasound image of the breast. Examples of the imaging condition information include a tube voltage, a tube current, and an irradiation time of the radiation source 17R, imaging date and time, a compression pressure of the compression member 40 against the breast, a thickness of the breast in the compression direction, an elapsed time from the start of the compression, and a rotation angle of the radiation emitting unit 17 with respect to the base 14.

Further, for example, the text information may be region-of-interest information on the region of interest included in the breast. The region-of-interest information is, for example, information indicating whether the region of interest is the region suspected of being the lesion or the high mammary gland region. Further, for example, in a case in which the region of interest is the region suspected of being the lesion, the region-of-interest information is an estimated disease name, a degree of certainty, or the like. As these pieces of information, for example, the information included in the imaging order may be used, or can be generated by the generation unit 64 based on the radiation image or the like. These pieces of information may be information on current imaging or may be information on past imaging related to the same examinee.

It should be noted that it is desirable that the text information is projected onto a region other than the breast. This is because it may be difficult to check a state of the breast in a case in which the text information is projected so as to be superimposed on the breast, or it may be difficult to read the text in a case in which the text information is projected across the breast and the imaging table 16.

Therefore, the generation unit 64 may divide the projection region into a breast region including the breast and a non-breast region not including the breast based on the detection color for each part of the projection region detected by the detection unit 62. Then, the generation unit 64 may generate the projection image so that the text information is projected onto the non-breast region.

It should be noted that the division of the projection region into the breast region and the non-breast region is not limited to the division based on the detection color described above. For example, the generation unit 64 may perform the division into the breast region and the non-breast region based on the pixel value of each pixel of the radiation image acquired by the acquisition unit 60.

Figure 11:
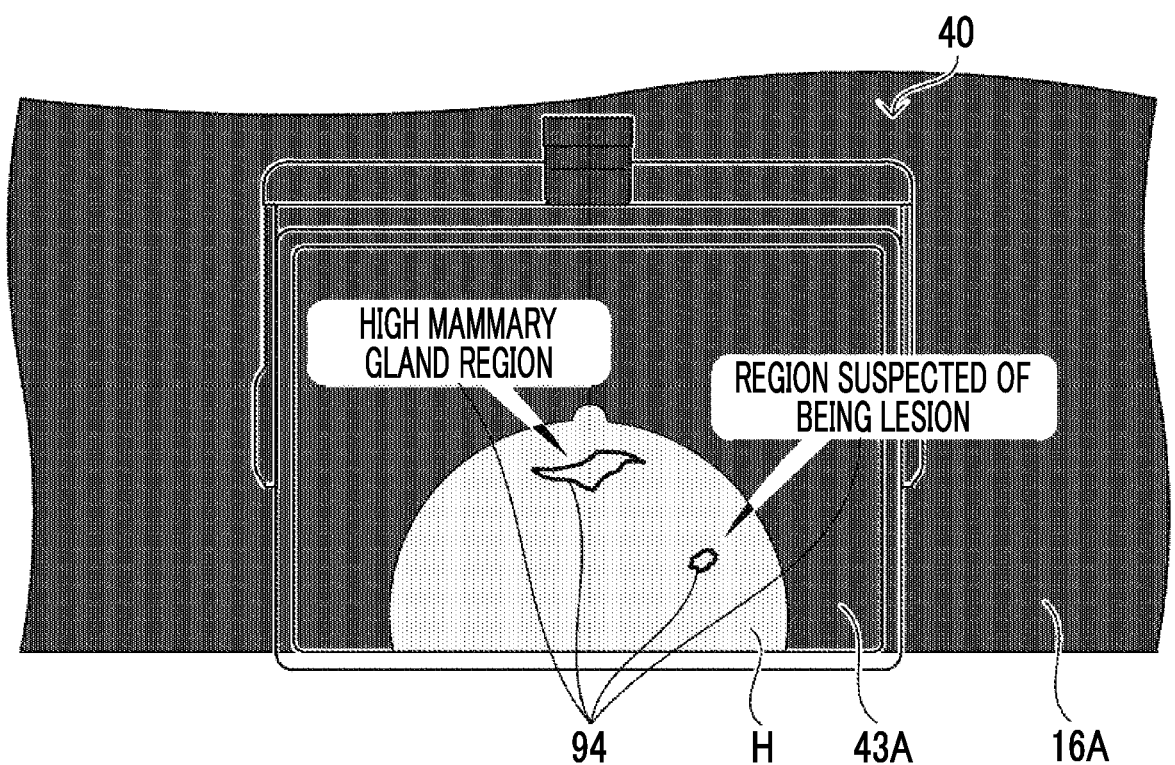
FIG. 11 is a diagram showing an example of a state in which the projection image is projected.

FIG. 11 is a diagram showing an example of a state in which the projection image 94 is projected onto the upper surface 43A of the compression member 40 and the imaging surface 16A of the imaging table 16 by the projector 39. The projection image 94 in FIG. 11 includes the positions of two regions of interest in the breast and the text information indicating whether each region of interest is the region suspected of being the lesion or the high mammary gland region.

The correction unit 66 acquires the projection image generated by the generation unit 64. Further, the correction unit 66 corrects the pixel value (hereinafter, referred to as "first pixel value") of each pixel forming the projection image, based on the color of the projection region detected by the detection unit 62. That is, the correction unit 66 corrects the color (hereinafter, referred to as "projection color") for each pixel of the projection image represented by the first pixel value in accordance with the detection color so that the visibility in a case in which the projection image is projected onto the breast or the like via the compression member 40 is improved.

Specifically, it is preferable that the correction unit 66 corrects the projection color in accordance with the detection color so that the contrast between the detection color and the projection color is increased. A complementary color and an opposite color are shown as a color relationship in which the contrast is increased. The correction unit 66 may correct the first pixel value so that the projection color indicated by the first pixel value is the color complementary color or the opposite color of the detection color of the projection region.

The complementary colors are colors opposite to each other in the hue ring. The correction unit 66 may derive three values of R, G, and B of the complementary colors in accordance with three values of R, G, and B of the detection colors detected by the detection unit 62, to correct the projection image by using the derived complementary colors. In the RGB color space, the complementary colors (rc, gc, bc) corresponding to certain colors (r, g, b) are represented by the following expressions, respectively.

$$A =$$

(maximum value out of $r, g,$ or $b$) + (minimum value out of $r, g,$ or $b$)

$$rc = A - r$$
$$gc = A - g$$
$$bc = A - b$$

The opposite colors are colors having at least one of hue, chroma saturation, or brightness opposite to each other. The correction unit 66 may derive three values of R, G, and B of the opposite colors in accordance with three values of R, G, and B of the detection colors detected by the detection unit 62, to correct the projection image by using the derived opposite colors. In the RGB color space of 256 gradations, the opposite colors (ro, go, bo) corresponding to certain colors (r, g, b) are represented by the following expressions, respectively.

$$ro = 255 - r$$
$$go = 255 - g$$
$$bo = 255 - b$$

It should be noted that a relationship between the projection color and the detection color is not limited to the complementary color and the opposite color, and any color can be associated with each other. For example, the opposite color corresponding to the color of bright skin typified by caucasian is a color close to black, but in a case in which a color close to black is projected onto the breast, there is a case in which a mistake for a spot and a mole occurs or the examinee feels uncomfortable, which is not preferable. Therefore, the correction unit 66 may correct the first pixel value by using the correction table 59 in which a correspondence relationship between the first pixel value (projection color) and the detection color of the projection region is determined in advance so that the correction to any color determined in advance can be performed based on the viewpoint of the visibility.

FIG. 12 shows an example of the correction table 59. In the correction table 59, the projection color is associated with each detection color. In FIG. 12, each of the detection color and the projection color is represented by three values of R, G, and B, and the color name is also described for ease of understanding. In FIG. 12, the complementary color or the opposite color of the detection color is basically determined in advance as the projection color. However, in a case of the "skin of caucasian", orange that is not the complementary color or the opposite color of the detection color is determined as the projection color. In addition, even in a case in which the complementary color or the opposite color is used as the projection color, it is not necessary to derive the projection color each time by holding the correspondence relationship between the detection color and the projection color as the table, so that it is possible to increase the speed of the process.

The correction of the first pixel value (projection color) described above may be performed for each pixel of the projection image. That is, the correction unit 66 may specify a corresponding part of the projection region for each pixel of the projection image, and may correct the first pixel value based on the detection color detected for the corresponding part of the projection region. In the projection image 94 of FIG. 11, a part overlapping the breast region in a balloon indicating the text information and the non-breast region are projected in different colors. As described above, by correcting the projection color for each pixel of the projection image, the visibility can be improved.

The correction of the first pixel value (projection color) may be performed uniformly so that the entire projection image can be easily seen on average. Specifically, the correction unit 66 may calculate an average color of the color for each part of the projection region, and may correct the first pixel value (projection color) based on the average color. For example, the correction unit 66 may correct the first pixel value of each pixel of the projection image to have the complementary color or the opposite color of the calculated average color. With such a form, the speed of the process can be increased as compared with the form in which the projection color is derived for each pixel of the projection image.

Further, for example, the correction unit 66 may vary a form of a character and a text box indicating the text information in accordance with the detected detection color. For example, the correction unit 66 may vary a form of a character color, font, bold, and italic of the text in accordance with the detected detection color, or may vary a background color of the text.

In addition, for example, in a case in which the character color and the background color of the series of texts are varied in accordance with the color for each part of the projection region, the text may be more difficult to read and the visibility may be decreased. Therefore, in a case in which the series of texts is projected to a plurality of parts of different colors, the correction unit 66 may suppress the influence of the color (detection color) of the projection destination by adding decoration such as a framed character and a shaded character to the text.

In addition, the correction unit 66 may adjust a light amount in a case in which the projection image is projected onto the projection region by the projector 39, based on the detection color of the projection region detected by the detection unit 62. This is because, depending on a combination of the detection color and the projection color of the projection region, the visibility may be further improved as the light amount is larger, or the visibility may be decreased in a case in which the light amount is excessively large. For example, in the correction table 59 of FIG. 12, the light amount (unit: percentage with respect to the maximum light amount of the projector 39) is determined for each detection color. The correction unit 66 may set the light amount of the projector 39 by using such a correction table 59.

In addition, in a case in which the user actually visually recognizes the projection image, which is projected onto the breast or the like via the compression member 40 by the projector 39, the ambient light caused by the illumination or the like is also visually recognized in addition to the projection light emitted from the projector 39. It is considered that the detection color detected by the detection unit 62 is a developed color in which the ambient light is also added, and it is considered that the visibility can be further improved by correcting the projection color by also adding the ambient light.

In this case, the detection unit 62 detects at least one of the color or the illuminance of the ambient light in an environment in which the projection image is projected to the projection region by the projector 39. The illuminance of the ambient light can be detected, for example, by an illuminance sensor. The illuminance sensor includes, for example, a photoelectric conversion element, such as a photodiode and a phototransistor, and a photoconductive element, such as a Cds cell, and detects ambient brightness to outputs a signal corresponding to the brightness. In addition, the color of the ambient light can also be detected by measuring the illuminance of the ambient light for each color component of R, G, and B.

The correction unit 66 corrects the first pixel value of the projection image projected by the projector 39, based on the color of the projection region detected by the detection unit 62 and at least one of the color or the illuminance of the ambient light. In addition, the correction unit 66 may adjust the light amount in a case in which the projection image is projected onto the projection region by the projector 39, based on at least one of the color or the illuminance of the ambient light detected by the detection unit 62.

Figure 13:
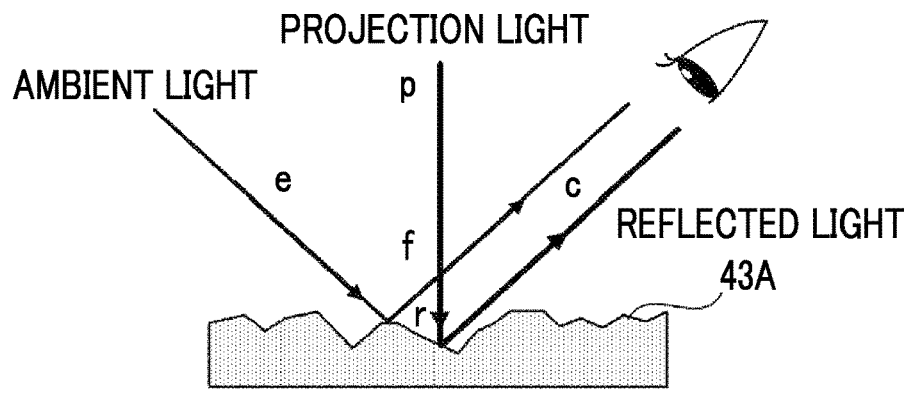
FIG. 13 is a diagram for describing correction in which ambient light is added.

The description of an example of the method of correcting the projection color in accordance with the ambient light will be made with reference to FIG. 13. FIG. 13 is a partially magnified view of the upper surface 43A of the compression member 40. As shown in FIG. 13, the upper surface 43A has a certain degree of asperity. Therefore, the user who visually recognizes the reflected light of the projection light emitted from the projector 39 also visually recognizes the reflected light of the ambient light caused by the illumination or the like.

In FIG. 13, the pixel value of the projection image input to the projector 39 is denoted by p, an attenuation term in consideration of attenuation due to a distance from the projector 39 to the upper surface 43A, an incidence angle, and the like is denoted by f, the illuminance of the ambient light is denoted by e, and the reflectivity of the upper surface 43A is denoted by r. In this case, in a case in which the brightness observed by the user is denoted by c, c is represented by Expression (1).

$$c = f \times r \times p + e \times r \quad (1)$$

In a case in which the target brightness to be observed by the user is denoted by ct, a pixel value pt to be input to the projector 39 is represented by Expression (2) in which Expression (1) is modified.

$$pt = (ct - e \times r)/f \times r \qquad (2)$$

Here, in a case in which it is assumed that the states of the projector 39 and the ambient light are not changed, each of the attenuation term f, the reflectivity r, and the illuminance e of the ambient light determined by a position/posture relationship between the projector 39 and the upper surface 43A can be regarded as a constant.

Further, it can be seen that the value of the brightness c0 observed in a case in which the pixel value p=0 (that is, black) is input to the projector 39 is equal to e×r based on Expression (1). In addition to the ambient light by the illumination, e×r includes a black offset that leaks from the lens even in a case in which the pixel value p=0 is input to the projector 39. In addition, f×r can be obtained by subtracting the brightness c0 (=e×r) from the brightness c1 observed in a case in which the pixel value p=255 (that is, white) is input to the projector. It should be noted that the brightness c0 and c1 can be measured by the illuminance sensor described above.

Therefore, by inputting the measured brightness c0 and c1 and the target brightness ct into Expression (2), the pixel value pt to be input to the projector 39 (that is, the pixel value that allows the user to visually recognize the desired brightness ct in a case in which the projector 39 projects the projection image onto the breast via the compression member 40) can be obtained. As the target brightness ct, for example, the maximum value with the best visibility can be selected.

For example, after deciding the projection color by using the correction table 59 based on the detection color detected by the detection unit 62, the correction unit 66 may further perform linear correction by using Expression (2). With such correction, the visibility can be further improved.

The correction unit 66 may perform known image correction such as gamma correction. In a case of performing the gamma correction, for example, gamma curve characteristics for the gamma correction may be stored in the storage unit 52 or the like in advance.

The controller 68 controls the projector 39 to project the projection image corrected by the correction unit 66. Specifically, the controller 68 controls the projector 39 to project the projection image in a period from completion of capturing the radiation image to completion of capturing the ultrasound image.

Figure 14:
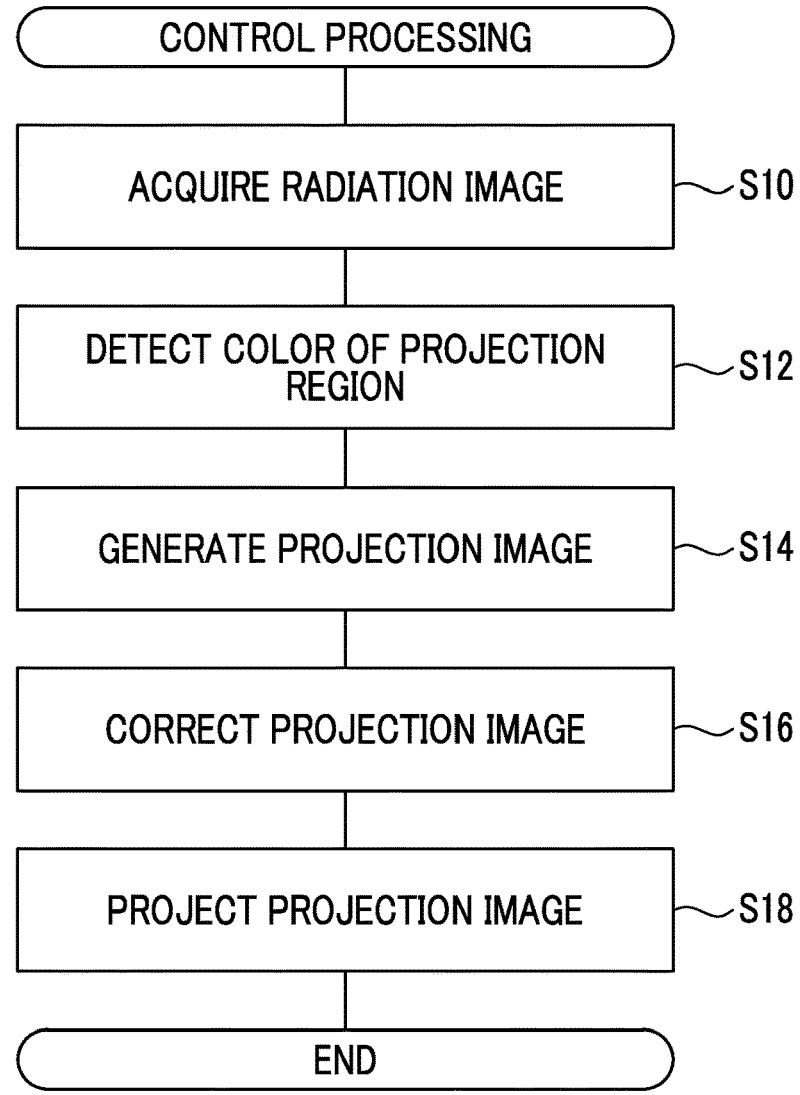
FIG. 14 is a flowchart showing an example of a control process.

Next, a description of an action of the console 50 according to the present embodiment will be made with reference to FIG. 14. In the console 50, the CPU 51 executes the control program 57 to execute a control process shown in FIG. 14. The control process is executed, for example, in a case in which the user gives an instruction to start the execution via the operation unit 55.

In step S10, the acquisition unit 60 acquires the radiation image captured by the imaging apparatus 10. In step S12, the detection unit 62 detects the color (detection color) of the projection region set in advance in at least a part of the upper surface 43A of the compression member 40. In step S14, the generation unit 64 generates the projection image based on the radiation image or the like acquired in step S10.

In step S16, the correction unit 66 corrects the first pixel value (projection color) of each pixel forming the projection image generated in step S14, based on the color of the projection region detected in step S12. In step S18, the controller 68 controls the projector 39 to project the projection image corrected in step S16 and terminates the present control process.

As described above, the imaging apparatus 10 according to one aspect of the present disclosure comprises at least one processor, in which the processor detects the color of the projection region set in advance in at least a part of the upper surface 43A of the transparent or translucent compression member 40 for putting the breast into the compressed state, the upper surface 43A being located on a side opposite to the contact surface 43B of the compression member 40 with the breast. In addition, the projection image projected onto the projection region by the projector 39 is acquired, and the first pixel value of each pixel forming the projection image is corrected based on the color of the projection region.

That is, with the imaging apparatus 10 according to the present embodiment, it is possible to improve the visibility in a case in which the information (projection image) for supporting the examination is projected onto the breast via the compression member 40, by correcting the color of the projection image in accordance with the color of the breast, the imaging table 16, or the like.

It should be noted that, in the embodiment described above, while the form is described in which the detection unit 62 detects the color for each part of the projection region, the present disclosure is not limited to this. The detection unit 62 need only detect at least a part of colors in the projection region. For example, in a case in which the detection color is specified by using the visible light image, the color of one pixel of the visible light image may be set as a representative value. In addition, for example, in a case in which the detection color is specified by the color sensor, the color measurement may be performed at one point in the projection region, and the color thereof may be set as a representative value.

In addition, in the embodiment described above, the form is described in which the console 50 is an example of a control apparatus according to the present disclosure, but an apparatus other than the console 50 may have the function of the control apparatus according to the present disclosure. In other words, an apparatus other than the console 50, such as the imaging apparatus 10 and the external apparatus, may have a part or all of the functions of the acquisition unit 60, the detection unit 62, the generation unit 64, the correction unit 66, and the controller 68.

In the embodiment described above, for example, as hardware structures of processing units that execute various types of processes, such as the acquisition unit 60, the detection unit 62, the generation unit 64, the correction unit 66, and the controller 68, various processors shown below can be used. As described above, in addition to the CPU that is a general-purpose processor that executes software (program) to function as various processing units, the various processors include a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute a specific process, such as an application specific integrated circuit (ASIC).

One processing unit may be configured by using one of the various processors or may be configured by using a combination of two or more processors of the same type or different types (for example, a combination of a plurality of FPGAs or a combination of a CPU and an FPGA). Moreover, a plurality of processing units may be configured of one processor.

A first example of the configuration in which the plurality of processing units are configured by using one processor is a form in which one processor is configured by using a combination of one or more CPUs and the software and this processor functions as the plurality of processing units, as represented by computers, such as a client and a server. Second, as represented by a system on chip (SoC) or the like, there is a form in which the processor is used in which the functions of the entire system which includes the plurality of processing units are realized by a single integrated circuit (IC) chip. In this way, as the hardware structure, the various processing units are configured by using one or more of the various processors described above.

Further, the hardware structure of these various processors is, more specifically, an electric circuit (circuitry) in which circuit elements such as semiconductor elements are combined.

In addition, in the embodiment described above, the aspect is described in which the various programs in the imaging apparatus 10 are stored (installed) in the ROM included in the controller 20 in advance, and the control program 57 in the console 50 is stored in the storage unit 52 in advance, but the present disclosure is not limited to this. The various programs and the control program 57 in the imaging apparatus 10 may be provided in a form of being recorded in a recording medium, such as a compact disc read only memory (CD-ROM), a digital versatile disc read only memory (DVD-ROM), and a universal serial bus (USB) memory. In addition, a form may be adopted in which the various programs and the control program 57 in the imaging apparatus 10 are downloaded from an external apparatus via the network. Further, the technique of the present disclosure extends to a storage medium that non-transitorily stores a program in addition to the program.

In the technique of the present disclosure, the embodiment and the examples described above can be combined as appropriate. The above-described contents and the above-shown contents are detailed descriptions for parts according to the technique of the present disclosure, and are merely examples of the technique of the present disclosure. For example, the above description related to the configuration, the function, the action, and the effect is the description related to the examples of the configuration, the function, the action, and the effect of the parts according to the technique of the present disclosure. As a result, it is needless to say that unnecessary parts may be deleted, new elements may be added, or replacements may be made with respect to the above-described contents and the above-shown contents within a range that does not deviate from the gist of the technique of the present disclosure.

Regarding the embodiment described above, the following additional notes are further disclosed.

Additional Note 1

A control apparatus comprising: at least one processor, in which the processor detects a color of a projection region set in advance in at least a part of an upper surface of a transparent or translucent compression member for putting a breast into a compressed state, the upper surface being located on a side opposite to a contact surface of the compression member with the breast, acquires a projection image projected onto the projection region by a projector, and corrects a first pixel value of each pixel forming the projection image, based on the color of the projection region.

Additional Note 2

The control apparatus according to additional note 1, in which the processor corrects the first pixel value so that a color indicated by the first pixel value is a complementary color or an opposite color of the color of the projection region.

Additional Note 3

The control apparatus according to additional note 1 or 2, in which the processor corrects the first pixel value by using a table in which a correspondence relationship between the first pixel value and the color of the projection region is determined in advance.

Additional Note 4

The control apparatus according to any one of additional notes 1 to 3, in which the processor specifies a corresponding part of the projection region for each pixel of the projection image, detects a color for each part of the projection region, and corrects the first pixel value based on the color of the corresponding part of the projection region.

Additional Note 5

The control apparatus according to additional notes 1 to 3, in which the processor detects a color for each part of the projection region, calculates an average color of the color for each part of the projection region, and corrects the first pixel value based on the average color.

Additional Note 6

The control apparatus according to any one of additional notes 1 to 5, in which the processor acquires a radiation image obtained by imaging the breast, extracts a region of interest from the radiation image, and generates the projection image indicating a position of the region of interest.

Additional Note 7

The control apparatus according to any one of additional notes 1 to 6, in which the processor generates the projection image including text information indicating at least one of examinee information on an examinee having the breast, imaging condition information on an imaging condition in a case in which at least one of a radiation image or an ultrasound image of the breast is captured, or region-of-interest information on a region of interest included in the breast.

Additional Note 8

The control apparatus according to additional note 7, in which the processor detects a color for each part of the projection region, divides the projection region into a breast region including the breast and a non-breast region not including the breast, based on the color for each part of the projection region, and generates the projection image so that the text information is projected onto the non-breast region.

Additional Note 9

The control apparatus according to any one of additional notes 1 to 8, in which the processor adjusts a light amount in a case in which the projection image is projected onto the projection region by the projector, based on the color of the projection region.

Additional Note 10

The control apparatus according to any one of additional notes 1 to 9, in which the processor detects at least one of a color or an illuminance of ambient light in an environment in which the projection image is projected onto the projection region by the projector, and corrects the first pixel value based on the color of the projection region and at least one of the color or the illuminance of the ambient light.

Additional Note 11

The control apparatus according to additional note 10, in which the processor adjusts a light amount in a case in which the projection image is projected onto the projection region by the projector, based on at least one of the color or the illuminance of the ambient light.

Additional Note 12

An imaging system comprising: the control apparatus according to any one of additional notes 1 to 11; and an imaging apparatus, in which the imaging apparatus includes the compression member for putting the breast into the compressed state between the compression member and an imaging table, a radiation source that irradiates the breast put into the compressed state by the compression member with radiation, a radiation detector that detects the radiation transmitted through the compression member and the breast, to generate a radiation image, an ultrasound probe that captures an ultrasound image of the breast put into the compressed state by the compression member, from a side of the upper surface of the compression member, and the projector that projects the projection image onto the projection region of the compression member.

Additional Note 13

The imaging system according to additional note 12, in which the imaging apparatus captures the radiation image of the breast by using the radiation source and the radiation detector, and then captures the ultrasound image of the breast by using the ultrasound probe, and the processor controls the projector to project the projection image in a period from completion of capturing the radiation image to completion of capturing the ultrasound image.

Additional Note 14

The imaging system according to additional note 12 or 13, in which a part of the compression member including the contact surface and the upper surface has a total light transmittance equal to or higher than 85%, which is measured in accordance with ISO 13468-1.

Additional Note 15

A control method including: detecting a color of a projection region set in advance in at least a part of an upper surface of a transparent or translucent compression member for putting a breast into a compressed state, the upper surface being on a side opposite to a contact surface of the compression member with the breast; acquiring a projection image projected onto the projection region by a projector; and correcting a first pixel value of each pixel forming the projection image, based on the color of the projection region.

Additional Note 16

A control program for causing a computer to execute a process including: detecting a color of a projection region set in advance in at least a part of an upper surface of a transparent or translucent compression member for putting a breast into a compressed state, the upper surface being on a side opposite to a contact surface of the compression member with the breast; acquiring a projection image projected onto the projection region by a projector; and correcting a first pixel value of each pixel forming the projection image, based on the color of the projection region.

What is claimed is:

1. A control apparatus comprising at least one processor, wherein the processor is configured to:
   detect a color of a projection region set in advance in at least a part of an upper surface of a transparent or translucent compression member for putting a breast into a compressed state, the upper surface being located on a side opposite to a contact surface of the compression member with the breast;
   acquire a projection image projected onto the projection region by a projector;
   correct a first pixel value of each pixel forming the projection image, based on the color of the projection region; and
   generate the projection image including text information indicating at least one of examinee information on an examinee having the breast, or imaging condition information on an imaging condition in a case in which at least one of a radiation image or an ultrasound image of the breast is captured.

2. The control apparatus according to claim 1, wherein the processor is configured to correct the first pixel value so that a color indicated by the first pixel value is a complementary color or an opposite color of the color of the projection region.

3. The control apparatus according to claim 1, wherein the processor is configured to correct the first pixel value by using a table in which a correspondence relationship between the first pixel value and the color of the projection region is determined in advance.

4. The control apparatus according to claim 1, wherein the processor is configured to:
   specify a corresponding part of the projection region for each pixel of the projection image;
   detect a color for each part of the projection region; and
   correct the first pixel value based on the color of the corresponding part of the projection region.

5. The control apparatus according to claim 1, wherein the processor is configured to:
   detect a color for each part of the projection region;
   calculate an average color of the color for each part of the projection region; and
   correct the first pixel value based on the average color.

6. The control apparatus according to claim 1, wherein the processor is configured to:
   acquire a radiation image obtained by imaging the breast;
   extract a region of interest from the radiation image; and
   generate the projection image indicating a position of the region of interest.

7. The control apparatus according to claim 1, wherein the processor is configured to generate the projection image including region-of-interest information on a region of interest included in the breast.

8. The control apparatus according to claim 7, wherein the processor is configured to:
   detect a color for each part of the projection region;
   divide the projection region into a breast region including the breast and a non-breast region not including the breast, based on the color for each part of the projection region; and
   generate the projection image so that the text information is projected onto the non-breast region.

9. The control apparatus according to claim 1, wherein the processor is configured to adjust a light amount in a case in which the projection image is projected onto the projection region by the projector, based on the color of the projection region.

10. The control apparatus according to claim 1, wherein the processor is configured to:
    detect at least one of a color or an illuminance of ambient light in an environment in which the projection image is projected onto the projection region by the projector; and
    correct the first pixel value based on the color of the projection region and at least one of the color or the illuminance of the ambient light.

11. The control apparatus according to claim 10, wherein the processor is configured to adjust a light amount in a case in which the projection image is projected onto the projection region by the projector, based on at least one of the color or the illuminance of the ambient light.

12. An imaging system comprising:
the control apparatus according to claim 1; and
an imaging apparatus, wherein
the imaging apparatus includes:
the compression member for putting the breast into the compressed state between the compression member and an imaging table;
a radiation source that irradiates the breast put into the compressed state by the compression member with radiation;
a radiation detector that detects the radiation transmitted through the compression member and the breast, to generate a radiation image;
an ultrasound probe that captures an ultrasound image of the breast put into the compressed state by the compression member, from a side of the upper surface of the compression member; and
the projector that projects the projection image onto the projection region of the compression member.

13. The imaging system according to claim 12, wherein:
the imaging apparatus captures the radiation image of the breast by using the radiation source and the radiation detector, and then captures the ultrasound image of the breast by using the ultrasound probe, and
the processor is configured to control the projector to project the projection image in a period from completion of capturing the radiation image to completion of capturing the ultrasound image.

14. The imaging system according to claim 12, wherein a part of the compression member including the contact surface and the upper surface has a total light transmittance equal to or higher than 85%, which is measured in accordance with ISO 13468-1.

15. A control method comprising:
detecting a color of a projection region set in advance in at least a part of an upper surface of a transparent or translucent compression member for putting a breast into a compressed state, the upper surface being on a side opposite to a contact surface of the compression member with the breast;
acquiring a projection image projected onto the projection region by a projector;
correcting a first pixel value of each pixel forming the projection image, based on the color of the projection region; and
generating the projection image including text information indicating at least one of examinee information on an examinee having the breast, or imaging condition information on an imaging condition in a case in which at least one of a radiation image or an ultrasound image of the breast is captured.

16. A non-transitory computer-readable storage medium storing a control program for causing a computer to execute a process comprising:
detecting a color of a projection region set in advance in at least a part of an upper surface of a transparent or translucent compression member for putting a breast into a compressed state, the upper surface being on a side opposite to a contact surface of the compression member with the breast;
acquiring a projection image projected onto the projection region by a projector;
correcting a first pixel value of each pixel forming the projection image, based on the color of the projection region; and
generating the projection image including text information indicating at least one of examinee information on an examinee having the breast, or imaging condition information on an imaging condition in a case in which at least one of a radiation image or an ultrasound image of the breast is captured.

* * * * *